(12) United States Patent
Woo et al.

(10) Patent No.: US 12,034,119 B2
(45) Date of Patent: *Jul. 9, 2024

(54) ELECTROLYTE FOR LITHIUM SECONDARY BATTERY AND LITHIUM SECONDARY BATTERY COMPRISING SAME

(71) Applicant: SAMSUNG SDI CO., LTD., Yongin-si (KR)

(72) Inventors: Myungheui Woo, Yongin-si (KR); Pavel Shatunov, Yongin-si (KR); Olga Tsay, Yongin-si (KR); Hyejin Park, Yongin-si (KR); Harim Lee, Yongin-si (KR); Jin-Hyeok Lim, Yongin-si (KR); Wonseok Cho, Yongin-si (KR); Hyunbong Choi, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 677 days.

This patent is subject to a terminal disclaimer.

(21) Appl. No.: 17/260,359

(22) PCT Filed: Jun. 18, 2019

(86) PCT No.: PCT/KR2019/007325
§ 371 (c)(1),
(2) Date: Jan. 14, 2021

(87) PCT Pub. No.: WO2020/032378
PCT Pub. Date: Feb. 13, 2020

(65) Prior Publication Data
US 2021/0296702 A1 Sep. 23, 2021

(30) Foreign Application Priority Data
Aug. 7, 2018 (KR) .......................... 10-2018-0091924

(51) Int. Cl.
*H01M 4/13* (2010.01)
*C07F 7/18* (2006.01)
(Continued)

(52) U.S. Cl.
CPC ....... *H01M 10/0567* (2013.01); *C07F 7/1804* (2013.01); *H01M 4/13* (2013.01);
(Continued)

(58) Field of Classification Search
CPC ......... H01M 10/0567; H01M 10/0568; H01M 10/0569; H01M 10/0525; H01M 10/0587
See application file for complete search history.

(56) References Cited

U.S. PATENT DOCUMENTS

2002/0197537 A1 12/2002 Kim et al.
2005/0244719 A1 11/2005 Kim et al.
(Continued)

FOREIGN PATENT DOCUMENTS

CN 1385919 A 12/2002
CN 1822423 A 8/2006
(Continued)

OTHER PUBLICATIONS

Machine Translation of: Usami et al. (JP 2009/004352), Jan. 8, 2009.*
(Continued)

*Primary Examiner* — Kenneth J Douyette
(74) *Attorney, Agent, or Firm* — Lee IP Law, P.C.

(57) ABSTRACT

The present disclosure relates to an electrolyte for a lithium secondary battery and a lithium secondary battery comprising same, the electrolyte comprising: a non-aqueous organic solvent; a lithium salt; and an additive, wherein the additive includes a compound represented by Chemical Formula 1 and a negative electrode film forming agent. Formula 1 is as described in the specification. For example, the electrolyte (Continued)

for a lithium secondary battery includes a non-aqueous organic solvent, a lithium salt, and an additive, and the additive includes a compound represented by Chemical Formula 1 and a negative electrode film forming agent. Description of Chemical Formula 1 is as described in the specification.

13 Claims, 5 Drawing Sheets

(51) Int. Cl.
*H01M 10/0525* (2010.01)
*H01M 10/0567* (2010.01)
*H01M 10/0568* (2010.01)
*H01M 10/0569* (2010.01)
*H01M 4/02* (2006.01)

(52) U.S. Cl.
CPC ... *H01M 10/0525* (2013.01); *H01M 10/0568* (2013.01); *H01M 10/0569* (2013.01); *H01M 2004/027* (2013.01)

(56) References Cited

U.S. PATENT DOCUMENTS

| | | | |
|---|---|---|---|
| 2008/0138715 | A1 | 6/2008 | Ihara et al. |
| 2010/0255369 | A1* | 10/2010 | Hwang ............... H01M 4/505 429/324 |
| 2011/0076572 | A1* | 3/2011 | Amine ................ H01M 10/05 429/328 |
| 2013/0071733 | A1 | 3/2013 | Abe et al. |
| 2013/0078533 | A1 | 3/2013 | Kang et al. |
| 2015/0221976 | A1 | 8/2015 | Lim et al. |
| 2016/0027592 | A1 | 1/2016 | Shimamoto et al. |
| 2016/0254568 | A1 | 9/2016 | Chesneau et al. |
| 2019/0363397 | A1 | 11/2019 | Shatunov et al. |

FOREIGN PATENT DOCUMENTS

| | | |
|---|---|---|
| CN | 103022558 A | 4/2013 |
| CN | 104821413 A | 8/2015 |
| CN | 105409048 A | 3/2016 |
| JP | 2009-004352 A | 1/2009 |
| JP | 2017-168347 A | 9/2017 |
| JP | 2017-174740 A | 9/2017 |
| KR | 10-2008-0097599 A | 11/2008 |
| KR | 10-2013-0119842 A | 11/2013 |
| KR | 10-2013-0135150 A | 12/2013 |
| KR | 10-1352333 B1 | 1/2014 |
| KR | 10-2015-0139847 A | 12/2015 |
| KR | 10-2019-0133449 A | 12/2019 |

OTHER PUBLICATIONS

International Search Report dated Sep. 25, 2019 for PCT/KR2019/007325.
Chinese Office action and Search Report dated Dec. 21, 2023.

* cited by examiner

ELECTROLYTE FOR LITHIUM SECONDARY BATTERY AND LITHIUM SECONDARY BATTERY COMPRISING SAME

CROSS REFERENCE TO RELATED APPLICATIONS

This is the U.S. national phase of PCT/KR2019/007325 filed on Jun. 18, 2019, which is based on Korean Patent Application No. 10-2018-0091924 filed on Aug. 7, 2018, the entire contents of all of which are hereby incorporated by reference.

TECHNICAL FIELD

An electrolyte for a lithium secondary battery and a lithium secondary battery including the same are disclosed.

BACKGROUND ART

A lithium secondary battery may be recharged and has three or more times as high energy density per unit weight as a conventional lead storage battery, nickel-cadmium battery, nickel hydrogen battery, nickel zinc battery and the like. It may be also charged at a high rate and thus, is commercially manufactured for a laptop, a cell phone, an electric tool, an electric bike, and the like, and researches on improvement of additional energy density have been actively made.

Such a lithium secondary battery is manufactured by injecting an electrolyte into a battery cell, which includes a positive electrode including a positive active material capable of intercalating/deintercalating lithium ions and a negative electrode including a negative active material capable of intercalating/deintercalating lithium ions.

Particularly, an electrolyte includes an organic solvent in which a lithium salt is dissolved and critically determines stability and performance of a lithium secondary battery.

$LiPF_6$ that is most commonly used as a lithium salt of an electrolyte has a problem of reacting with an electrolytic solvent to promote depletion of a solvent and generate a large amount of gas. When $LiPF_6$ is decomposed, it generates LiF and $PF_5$, which leads to electrolyte depletion in the battery, resulting in degradation in high temperature performance and poor safety.

There are needs for an electrolyte which suppresses side reactions of such a lithium salt and improves the performance of the battery.

DISCLOSURE

Technical Problem

An embodiment provides an electrolyte for a lithium secondary battery with improved cycle-life characteristics while securing high temperature stability.

Another embodiment provides a lithium secondary battery including the electrolyte for a lithium secondary battery.

Technical Solution

An embodiment of the present invention provides an electrolyte for a lithium secondary battery including a non-aqueous organic solvent, a lithium salt and an additive, wherein the additive includes a compound represented by Chemical Formula 1 and a negative electrode film forming agent.

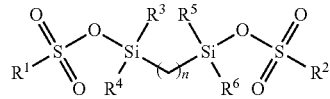

[Chemical Formula 1]

In Chemical Formula 1,
$R^1$ to $R^6$ are independently hydrogen, a substituted or unsubstituted $C_1$ to C10 alkyl group, a substituted or unsubstituted C1 to C10 alkoxy group, a substituted or unsubstituted C2 to C10 alkenyl group, a substituted or unsubstituted C2 to C10 alkynyl group, a substituted or unsubstituted C3 to C10 cycloalkyl group, or a substituted or unsubstituted C3 to C10 cycloalkenyl group, and
n is an integer of 1 to 10.

Chemical Formula 1 may be represented by Chemical Formula 1A.

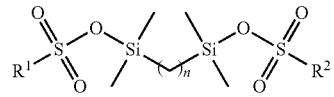

[Chemical Formula 1A]

In Chemical Formula 1A,
$R^1$ and $R^2$ are independently hydrogen, a substituted or unsubstituted C1 to C10 alkyl group, a substituted or unsubstituted C1 to C10 alkoxy group, a substituted or unsubstituted C2 to C10 alkenyl group, a substituted or unsubstituted C2 to C10 alkynyl group, a substituted or unsubstituted C3 to C10 cycloalkyl group, or a substituted or unsubstituted C3 to C10 cycloalkenyl group, and
n is an integer of 1 to 10.

$R^1$ and $R^2$ may independently be a substituted or unsubstituted C1 to C4 alkyl group, or a substituted or unsubstituted C2 to C4 alkenyl group.

$R^1$ and $R^2$ may independently be a C1 to C4 alkyl group that is substituted or unsubstituted with a halogen or a cyano group, or a C2 to C4 alkenyl group that is substituted or unsubstituted with a halogen or a cyano group.

$R^1$ and $R^2$ may independently be a methyl group, an ethyl group, or a vinyl group and $R^3$ to $R^6$ may independently be a substituted or unsubstituted C1 to C5 alkyl group.

The negative electrode film forming agent may include at least one of vinylene carbonate (VC), vinylethylene carbonate (VEC), and fluoroethylene carbonate (FEC).

The compound represented by Chemical Formula 1 may be included in an amount of 0.05 wt % to 5 wt % based on a total amount of the electrolyte for the lithium secondary battery, and the negative electrode film forming agent may be included in an amount of 0.05 wt % to 20 wt % based on a total amount of the electrolyte for the lithium secondary battery.

The compound represented by Chemical Formula 1 may be included in an amount of 0.1 wt % to 2 wt % based on a total amount of the electrolyte for the lithium secondary battery, and the negative electrode film forming agent may be included in an amount of 0.5 wt % to 5 wt % based on a total amount of the electrolyte for the lithium secondary battery.

The additive may further include a nitrile-based compound.

The nitrile-based compound may include at least one of succinonitrile, adiponitrile, and glutaronitrile.

The nitrile-based compound may be included in an amount of 0.2 wt % to 5 wt % based on a total amount of the electrolyte for the lithium secondary battery.

Another embodiment of the present invention provides a lithium secondary battery including a positive electrode; a negative electrode; and the electrolyte.

A solid electrolyte interphase (SEI) layer may be further included on the surface of the negative electrode, and the SEI layer may include a reaction product of the additive.

Advantageous Effects

While securing high temperature stability, it is possible to implement a lithium secondary battery with further improved cycle-life characteristics.

DESCRIPTION OF SYMBOLS

Figure 1:
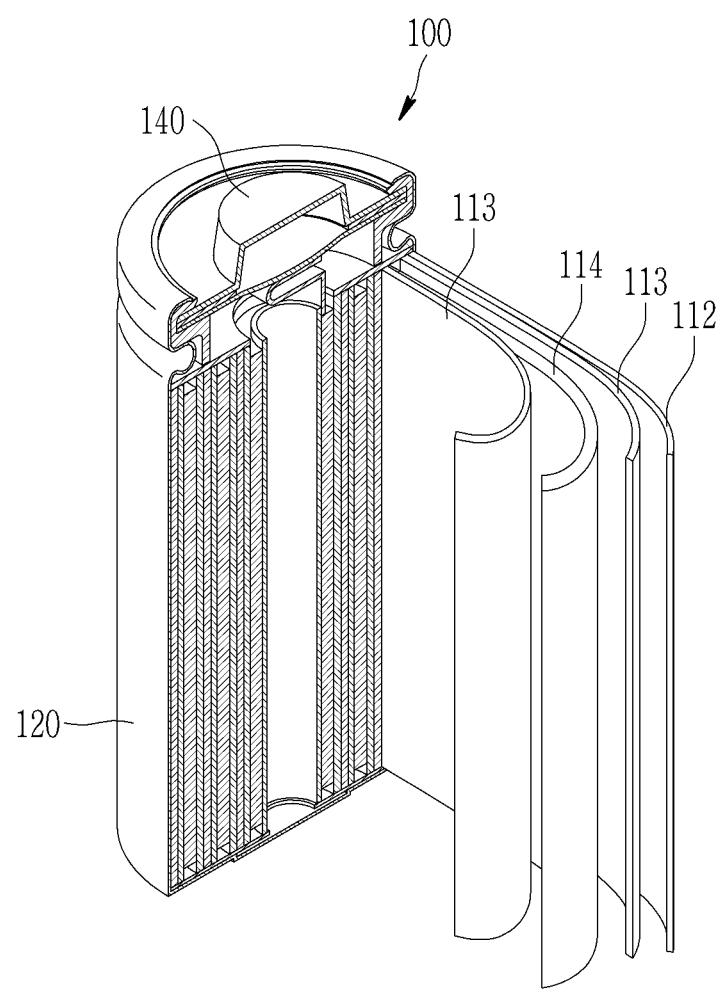
FIG. 1 is a schematic diagram showing a lithium secondary battery according to an embodiment of the present invention.

100: lithium secondary battery
112: negative electrode
113: separator
114: positive electrode
120: battery case
140: sealing member

MODE FOR INVENTION

Hereinafter, embodiments of the present invention are described in detail. However, these embodiments are exemplary, the present invention is not limited thereto and the present invention is defined by the scope of claims.

In the present specification, when a definition is not otherwise provided, 'substituted' refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

Hereinafter, an electrolyte for a lithium secondary battery according to an embodiment is described.

An electrolyte for a lithium secondary battery according to an embodiment includes a non-aqueous organic solvent, a lithium salt, and an additive, wherein the additive includes a compound represented by Chemical Formula 1 and a negative electrode film forming agent.

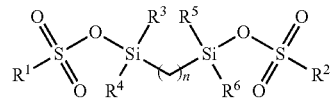

[Chemical Formula 1]

In Chemical Formula 1, $R^1$ to $R^6$ are independently hydrogen, a substituted or unsubstituted C1 to C10 alkyl group, a substituted or unsubstituted C1 to C10 alkoxy group, a substituted or unsubstituted C2 to C10 alkenyl group, a substituted or unsubstituted C2 to C10 alkynyl group, a substituted or unsubstituted C3 to C10 cycloalkyl group, or a substituted or unsubstituted C3 to C10 cycloalkenyl group, and n is an integer of 1 to 10.

The compound represented by Chemical Formula 1 that is a neutral compound without charges and has excellent solubility in a solvent, and it is easy to control the content thereof.

In addition, the compound represented by Chemical Formula 1 has an anodic oxidation decomposition reaction or interacts with $LiPF_6$ during the charge and thus forms a firm ion-conductive CEI (cathode-electrolyte interface) film rich in chemical species having a polar —$SO_3$— group, and an —Si—O-group of the compound represented by Chemical Formula 1 may react with $F^-$-containing chemical species (e.g., HF) in the electrolyte and capture $F^-$ and thus form a compound having a strong Si—F bond and resultantly, prevent a positive electrode from being dissolved or decomposed by HF. Accordingly, an undesired side reaction between the electrode and the electrolyte may be suppressed, and accordingly, an amount of generated gas inside a battery may be reduced, and a resistance increase rate inside the lithium secondary battery may be decreased.

In addition, since the compound represented by Chemical Formula 1 includes two —$SO_2$—O—Si-groups inside one molecule, the aforementioned effect may be further maximized at the same molar concentration as that of a compound including one —$SO_2$—O—Si— group inside one molecule.

Furthermore, the negative electrode film forming agent is added thereto to form a film on the surface of the negative electrode of the lithium secondary battery, which may suppress a rapid reaction between the negative electrode and the non-aqueous electrolyte particularly at a high temperature during the charge and discharge and thus prevent a thermal runaway of the lithium secondary battery in advance and resultantly, improve cycle-life characteristics.

For example, Chemical Formula 1 may be represented by Chemical Formula 1A.

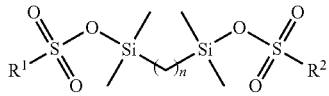

[Chemical Formula 1A]

In Chemical Formula 1A, $R^1$, $R^2$, and n are the same as described above.

For example, $R^1$ and $R^2$ may independently be a substituted or unsubstituted C1 to C4 alkyl group, or a substituted or unsubstituted C2 to C4 alkenyl group.

For example, $R^1$ and $R^2$ may independently be a C1 to C4 alkyl group that is substituted or unsubstituted with a halogen or a cyano group, or a C2 to C4 alkenyl group that is substituted or unsubstituted with a halogen or a cyano group.

As one example, $R^1$ and $R^2$ may independently be a methyl group, an ethyl group, or a vinyl group and $R^3$ to $R^6$ may independently be a substituted or unsubstituted C1 to C5 alkyl group.

The negative electrode film forming agent may include at least one of vinylene carbonate (VC), vinylethylene carbonate (VEC), and fluoroethylene carbonate (FEC).

A double bond included in the negative electrode film forming agent is supplied with electrons from dissociated anions of the non-aqueous organic solvent, from the surface of the negative electrode and thus reduced into anion radicals, and these anion radicals react with another double bond and thus have a polymerization reaction, and the negative electrode film forming agent may form an SEI (solid electrolyte interphase) layer not dissolved in the electrolyte on the surface of the negative electrode.

When the SEI layer grows beyond a certain thickness, the negative electrode film-forming agent is not diffused up to lithium metal to complete the polymerization reaction, and accordingly, a protective layer having a predetermined thickness remains on the lithium surface. Accordingly, the lithium secondary battery having the SEI layer may have excellent cycle-life characteristics.

For example, the compound represented by Chemical Formula 1 may be included in an amount of 0.05 wt % to 5 wt % based on a total amount of the electrolyte for the lithium secondary battery, and the negative electrode film forming agent may be included in an amount of 0.05 wt % to 20 wt % based on a total amount of the electrolyte for the lithium secondary battery.

For example, the compound represented by Chemical Formula 1 may be included in an amount of 0.05 wt % to 3 wt %, or 0.1 wt % to 3 wt %.

In addition, the negative electrode film forming agent may be included in an amount of 0.1 wt % to 20 wt %, or 0.1 wt % to 15 wt %.

As a most specific example, the compound represented by Chemical Formula 1 may be included in an amount of 0.1 wt % to 2 wt %, and the negative electrode film forming agent may be included in an amount of 0.5 wt % to 5 wt %.

When the content range of the compound represented by Chemical Formula 1 is within the above range, resistance increases and gas formation may be suppressed during high-temperature storage, thereby implementing a lithium secondary battery having improved charge-discharge characteristics.

That is, when the amount of the compound represented by Chemical Formula 1 is less than 0.05 wt %, storage characteristics at a high temperature may be deteriorated while when it is greater than 5 wt %, an interface resistance may be increased and thus cycle-life may be deteriorated.

In addition, when the content range of the negative electrode film forming agent is within the above range, a film having a sufficient thickness to protect the surface of the negative electrode may be formed within a range in which the conductivity of lithium ions is not lowered.

That is, when the content of the negative electrode film forming agent is less than 0.05 wt %, a film cannot be formed with a sufficient thickness, and when it exceeds 20 wt %, lithium ion conductivity may be disturbed due to excessive film formation.

The additive according to an embodiment may further include a nitrile-based compound in addition to the compound represented by Chemical Formula 1 and the negative electrode film forming agent.

The nitrile-based compound may include at least one of succinonitrile, adiponitrile, and glutaronitrile.

By forming a stable passivation film on the surface of the positive electrode by the nitrile-based compound, a performance of the battery may be improved and flame retardancy may be increased to secure stability.

The nitrile-based compound may be included in an amount of 0.2 wt % to 5 wt % based on a total amount of the electrolyte for the lithium secondary battery.

For example, the nitrile-based compound may be included in an amount of 0.5 wt % to 5 wt %, for example, it may be included in an amount of 1 wt % to 5 wt %.

The non-aqueous organic solvent serves as a medium for transmitting ions taking part in the electrochemical reaction of a battery.

The non-aqueous organic solvent may be a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, propylpropionate, decanolide, mevalonolactone, caprolactone, and the like. The ether-based solvent may include dibutyl ether, tetraglyme, diglyme, dimethoxyethane, 2-methyltetrahydrofuran, tetrahydrofuran, and the like. In addition, the ketone-based solvent may include cyclohexanone, and the like. The alcohol-based solvent may include ethanol, isopropyl alcohol, and the like and the aprotic solvent may include nitriles such as R—CN (wherein R is a hydrocarbon group having a C2 to C20 linear, branched, or cyclic structure and may include a double bond, an aromatic ring, or an ether bond), and the like, dioxolanes such as 1,3-dioxolane, and the like, sulfolanes, and the like.

The non-aqueous organic solvent may be used alone or in a mixture. When the organic solvent is used in a mixture, the mixture ratio may be controlled in accordance with a desirable battery performance.

The carbonate-based solvent is prepared by mixing a cyclic carbonate and a linear carbonate. When the cyclic carbonate and linear carbonate are mixed together in a volume ratio of 1:1 to 1:9, an electrolyte performance may be improved.

The non-aqueous organic solvent may further include an aromatic hydrocarbon-based organic solvent in addition to the carbonate based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 2.

[Chemical Formula 2]

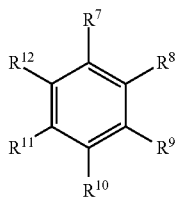

In Chemical Formula 2, $R^7$ to $R^{12}$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by Chemical Formula 3 in order to improve cycle-life of a battery.

[Chemical Formula 3]

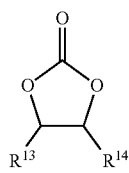

In Chemical Formula 3, $R^{13}$ and $R^{14}$ are the same or different and selected from hydrogen, a halogen, a cyano group (CN), a nitro group ($NO_2$), and a fluorinated C1 to C5 alkyl group, provided that at least one of $R^{13}$ and $R^{14}$ is a halogen, a cyano group (CN), a nitro group ($NO_2$), and a fluorinated C1 to C5 alkyl group and $R^{13}$ and $R^{14}$ are not simultaneously hydrogen.

Examples of the ethylene-based carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The lithium salt dissolved in the non-organic solvent supplies lithium ions in a battery, enables a basic operation of a lithium secondary battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example, an integer ranging from 1 to 20), LiCl, LiI and $LiB(C_2O_4)_2$ (lithium bis(oxalato) borate; LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

Another embodiment provides a lithium secondary battery including a positive electrode; a negative electrode; and the aforementioned electrolyte.

For example, the negative electrode may further include the SEI (solid electrolyte interphase) layer on the surface, of and the SEI layer may include a reaction product of the additive.

The SEI layer on the electrode surface of the lithium secondary battery according to an embodiment may have a thickness of 0.05 nm to 100 nm, for example, 0.1 nm to 80 nm, and specifically, 0.5 nm to 50 nm. When the SEI layer has a thickness within the ranges, the SEI layer may not adversely affect the transport of lithium ions and effectively prevent a direct contact of the electrode with the electrolyte.

The SEI layer may be not a film formed through an additional process such as coating and the like but derived from some of additives of the electrolyte.

For example, the SEI layer may be derived from the negative electrode film-forming agent, and the negative electrode film forming agent may include, for example, at least one from vinylene carbonate (VC), vinylethylene carbonate (VEC), and fluoroethylene carbonate (FEC).

Specifically, the negative electrode film forming agent may be used alone or used along with a nitrile-based compound, a positive electrode passivation film-forming agent, and the nitrile-based compound may include at least one of succinonitrile, adiponitrile, and glutaronitrile.

More specifically, the negative electrode film forming agent may be vinylene carbonate (VC) or vinylethylene carbonate (VEC) alone or a mixture of fluoroethylene carbonate (FEC) and a succinonitrile compound, but is not limited thereto.

The positive electrode includes a current collector and a positive active material layer disposed on the current collector and including a positive active material.

The positive active material may include lithiated intercalation compounds that reversibly intercalate and deintercalate lithium ions.

Specifically, at least one composite oxide of lithium and a metal of cobalt, manganese, nickel, or a combination thereof may be used.

Examples of the positive active material may be a compound represented by one of chemical formulae.

$Li_aA_{1-b}X_bD_2$ (0.90≤a≤1.8, 0≤b≤0.5); $Li_aA_{1-b}X_bO_{2-c}D$, (0.90≤a≤1.8, 0≤b≤0.5, 0≤c≤0.05); $Li_aE_{1-b}X_bO_{2-c}D$, (0.90≤a≤1.8, 0, 0≤b≤0.5, 0≤c≤0.05); $Li_aE_{2-b}X_bO_{4-c}D_c$ (0.90≤a≤1.8, 0, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0≤α≤2); $Li_aNi_{1-b-c}Co_bX_cO_{2-\alpha}T_\alpha$ (0.90≤a≤1.8, 0≤b≤0.5, 0≤c≤0.05, 0≤α≤2); $Li_aNi_{1-b-c}Co_bX_cO_{2-\alpha}T_2$ (0.90≤a≤1.8, 0≤b≤0.5, 0≤c≤0.05, 0≤α≤2); $Li_aNi_{1-b-c}Mn_bX_cD_\alpha$ (0.90≤a≤1.8, 0≤b≤0.5, 0≤c≤0.05, 0≤α≤2); $Li_aNi_{1-b-c}Mn_bX_cO_{2-\alpha}T_\alpha$ (0.90≤a≤1.8, 0≤b≤0.5, 0≤c≤0.05, 0≤α≤2); $Li_aNi_{1-b-c}Mn_bX_cO_{2-\alpha}T_2$ (0.90≤a≤1.8, 0≤b≤0.5, 0≤c≤0 ≤α≤2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3(0 \leq f \leq 2)$; $Li_{(3-f)}Fe_2(PO_4)_3(0 \leq f \leq 2)$; $Li_aFePO_4(0.90 \leq a \leq 1.8)$ In chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof, Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method (e.g., spray coating, dipping, etc.), but is not illustrated in more detail since it is well-known to those skilled in the related field.

As a specific example of the positive active material according to an embodiment of the present invention, $LiNi_{1-x-y}Co_xMn_yO_2$ ($0 \leq x \leq 0.5$ and $0 \leq y \leq 0.5$) may be mentioned.

The positive active material may be included in an amount of 90 wt % to 98 wt % based on a total weight of the positive active material layer.

In an embodiment of the present invention, the positive active material layer may include a binder and a conductive material. Herein, the binder and the conductive material may be included in an amount of 1 wt % to 5 wt %, respectively based on a total amount of the positive active material layer.

The binder improves binding properties of positive active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material is included to provide electrode conductivity, any electrically conductive material may be used as a conductive material unless it causes a chemical change and examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may use Al, but is not limited thereto.

The negative electrode includes a current collector and a negative active material layer formed on the current collector and including a negative active material.

The negative active material may include a material that reversibly intercalates/deintercalates lithium ions, a lithium metal, a lithium metal alloy, a material being capable of doping/dedoping lithium, or transition metal oxide.

The material that reversibly intercalates/deintercalates lithium ions may include a carbon material, the carbon material may be any generally-used carbon-based negative active material in a lithium ion secondary battery, and examples thereof may be crystalline carbon, amorphous carbon, or a mixture thereof. The crystalline carbon may be non-shaped, or sheet, flake, spherical, or fiber shaped natural graphite or artificial graphite and the amorphous carbon may be a soft carbon, a hard carbon, a mesophase pitch carbonization product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may be Si, Si—C composite, $SiO_x$ ($0<x<2$), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), Sn, $SnO_2$, Sn—R (wherein R is an element selected from an alkali metal, an alkaline-earth metal, a Group 13 element, a Group 14 element, a Group 15 element, a Group 16 element, a transition metal, a rare earth element, and a combination thereof, and not Sn), and the like and at least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, or lithium titanium oxide.

In the negative active material layer, the negative active material may be included in an amount of 95 wt % to 99 wt % based on the total weight of the negative active material layer.

In an embodiment of the present invention, the negative active material layer includes a binder, and optionally a conductive material. In the negative active material layer, a content of the binder may be 1 wt % to 5 wt % based on a total weight of the negative active material layer. When the negative active material layer includes a conductive material, the negative active material layer includes about 90 wt % to about 98 wt % of the negative active material, 1 wt % to 5 wt % of the binder, and 1 wt % to 5 wt % of the conductive material.

The binder improves binding properties of negative active material particles with one another and with a current collector. The binder includes a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, polyethylene, polypropylene, an ethylene propylene copolymer, polyethyleneoxide, polyvinylpyrrolidone, polyepichlorohydrine, polyphosphazene, polyacrylonitrile, polystyrene, an ethylenepropylenediene copolymer, polyvinylpyridine, chlorosulfonated polyethylene, latex, a polyester resin, an acrylic resin, a phenolic resin, an epoxy resin, polyvinyl alcohol, and a combination thereof.

When the water-soluble binder is used as a negative electrode binder, a cellulose-based compound as a thickener may be further used to provide viscosity. The cellulose-based compound includes one or more of carboxymethyl cellulose, hydroxypropylmethyl cellulose, methyl cellulose, or alkali metal salts thereof. The alkali metals may be Na, K, or Li. Such a thickener may be included in an amount of 0.1 to 3 parts by weight based on 100 parts by weight of the negative active material.

The conductive material is included to provide electrode conductivity, any electrically conductive material may be used as a conductive material unless it causes a chemical change, and examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The lithium secondary battery may further include a separator between the negative electrode and the positive electrode, depending on a type of the lithium secondary battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Referring to FIG. 1, a lithium secondary battery 100 according to an embodiment includes a battery cell including a negative electrode 112, a positive electrode 114 facing the negative electrode 112, a separator 113 interposed between the negative electrode 112 and the positive electrode 114, and an electrolyte 113 (not shown) for a lithium secondary battery impregnating the negative electrode 112, the positive electrode 114, and the separator 113, a battery case 120 housing the battery cell, and a sealing member 140 sealing the battery case 120.

DETAILED DESCRIPTION OF THE EMBODIMENTS

Hereinafter, examples of the present invention and comparative examples are described. These examples, however, are not in any sense to be interpreted as limiting the scope of the invention.

Manufacture of Lithium Secondary Battery Cell

Preparation Example 1: Synthesis of Compound 1-1

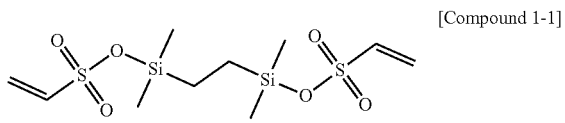 [SMILES: C=CS(=O)(=O)O[Si](C)(C)CC[Si](C)(C)OS(=O)(=O)C=C]

[Compound 1-1]

Trimethylsilylsulfonyl chloride (38.47.53 g, 0.204 mol) was added in a dropwise fashion to 1,4-divinyl-1,1,4,4,-tetramethyl-1,4-disilabutane (19.94 g, 0.101 mol) for 2 hours under a cooling condition. Subsequently, the reaction mixture was maintained at room temperature (20° C.) for 15 hours. Then, the reaction mixture was heated up to 110° C. and maintained at the same temperature for 5 hours, and simultaneously, a reaction product was distilled to remove trimethylsilyl chloride produced therein as a side product. The obtained product was cooled down to room temperature, and then, the remaining reaction product was distilled through a short Vigreux column under vacuum.

The obtained product was redistilled at a fractionation temperature of 184° C. to 188° C./0.05 Torr to obtain a colorless product in an oil state (21.78 g, 60.4%). The corresponding material was very sensitive to moisture.

1H NMR (400 MHz, CDCl3), δ 0.40 (s, 12H), 0.82 (s, 4H), 5.97 (d, 2H), 6.32 (d, 2H), 6.62 (dd, 2H).

13C NMR (100 MHz, CDCl3), δ −1.74 (s), 7.59 (s), 127.23 (s), 135.24 (s).

29Si NMR (80 MHz, CDCl3), δ 33.62 (s).

Preparation Example 2: Synthesis of Compound 1-2

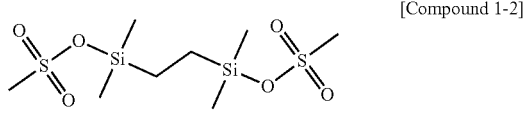

[Compound 1-2]

A mixture of 1,2-bis(chlorodimethylsilyl)ethane (21.53 g, 0.1 mol) and methanesulfonic acid (19.22 g, 0.2 mol) was heated up to 65° C. for 30 minutes and maintained at the same temperature for about 1 hour, until a reaction with HCl was completed. Subsequently, the temperature of the reaction mixture was increased up to 120° C. and then, maintained for 24 hours. The resultant was cooled down to room temperature and distilled under vacuum through Vigreux column. Herein, a distillation condenser was kept warm to prevent clogging of the column due to recrystallization of a product therein. The product was treated through fractional distillation at 162° C. to 164° C./0.05 Torr to obtain a colorless product in an oil state (23.19 g, 69.3%).

1H NMR (400 MHz, CDCl3), δ 0.33 (s, 12H), 0.75 (s, 4H), 2.93 (s, 6H).

13C NMR (100 MHz, CDCl3), δ −1.83 (s), 7.45 (s), 40.08 (s).

29Si NMR (80 MHz, CDCl3), δ 32.39 (s)

Preparation Example 3: Synthesis of Compound 1-3

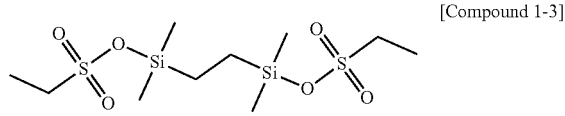 [SMILES: CCS(=O)(=O)O[Si](C)(C)CC[Si](C)(C)OS(=O)(=O)CC]
[Compound 1-3]

Compound 1-3, a colorless product in an oil state, (22.14 g, 67.03%) was obtained according to the same method as Preparation Example 2 except that ethane sulfonic acid (22.03 g, 0.2 mol) was used instead of the methane sulphonic acid of Preparation Example 2.

1H NMR (400 MHz, CDCl3), δ 0.55 (S, 12H), 1.27 (t, 4H), 2.72 (s, 6H)

13C NMR (100 MHz, CDCl3), δ 1.30 (s), 10.3 (s), 41.1 (s)

29Si NMR (80 MHz, CDCl3), δ 34.50 (s)

Comparative Preparation Example 1: Synthesis of Compound 2a

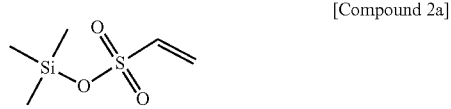
[Compound 2a]

Compound 2a (10.54 g, 64.21%) was obtained according to the same method as Preparation Example 1-1 except that trimethylsilyl chloride (10.01 g, 0.1 mol) and ethane sulfonic acid (10.86 g, 0.1 mol) were used.

Example 1

$LiNi_{1/3}Co_{1/3}Mn_{1/3}O_2$ as a positive active material, polyvinylidene fluoride as a binder, and ketjen black as a conductive material were mixed in a weight ratio of 90:5:5 and then, dispersed in N-methyl pyrrolidone to prepare positive active material slurry.

The positive active material slurry was coated on a 15 μm-thick Al foil, dried at 100° C., and pressed to manufacture a positive electrode.

Graphite as a negative active material, polyvinylidene fluoride as a binder, and ketjen black as a conductive material were mixed in a weight ratio of 90:5:5 and then, dispersed in N-methyl pyrrolidone to prepare negative active material slurry.

The negative active material slurry was coated on a 10 μm-thick Cu foil, dried at 100° C., and pressed to manufacture a negative electrode.

The positive and negative electrodes, a 25 μm-thick polyethylene separator, and an electrolyte were used to manufacture a lithium secondary battery cell.

The electrolyte has a following composition.
(Electrolyte Composition)
Salt: $LiPF_6$ 1.15 M
Solvent: ethylene carbonate/ethylmethyl carbonate/dimethyl carbonate (EC:EMC:DMC=a volume ratio of 1:1:1)
Additive: 0.5 wt % of Compound 1-1/2 wt % of vinylene carbonate (Herein, in the electrolyte composition, "wt %" is based on a total amount of an electrolyte (a lithium salt+a non-aqueous organic solvent+an additive))

Examples 2 to 4, Reference Example, and Comparative Examples 1 and 2

Lithium secondary battery cells were manufactured according to the same method as Example 1 except that the additive composition was changed as shown in Table 1.

TABLE 1

| Additive composition (wt %) | Chemical Formula 1 | | Negative electrode film forming agent | | |
|---|---|---|---|---|---|
| | Compound 1-1 | Compound 2a | VC | FEC | Succinonitrile |
| Example 1 | 0.5 | — | 2 | — | — |
| Example 2 | 1 | — | 2 | — | — |
| Example 3 | 0.5 | — | 2 | — | 2 |
| Example 4 | 0.5 | — | — | 2 | 2 |
| Reference Example | 0.5 | — | — | — | — |
| Comparative Example 1 | — | 1 | 2 | — | — |
| Comparative Example 2 | — | 1 | 2 | — | — |

Battery Characteristics Evaluation

Evaluation 1: Measurement of Initial Impedance and Impedance Spectra after Stored at High Temperature (60° C.)

Figure 2:
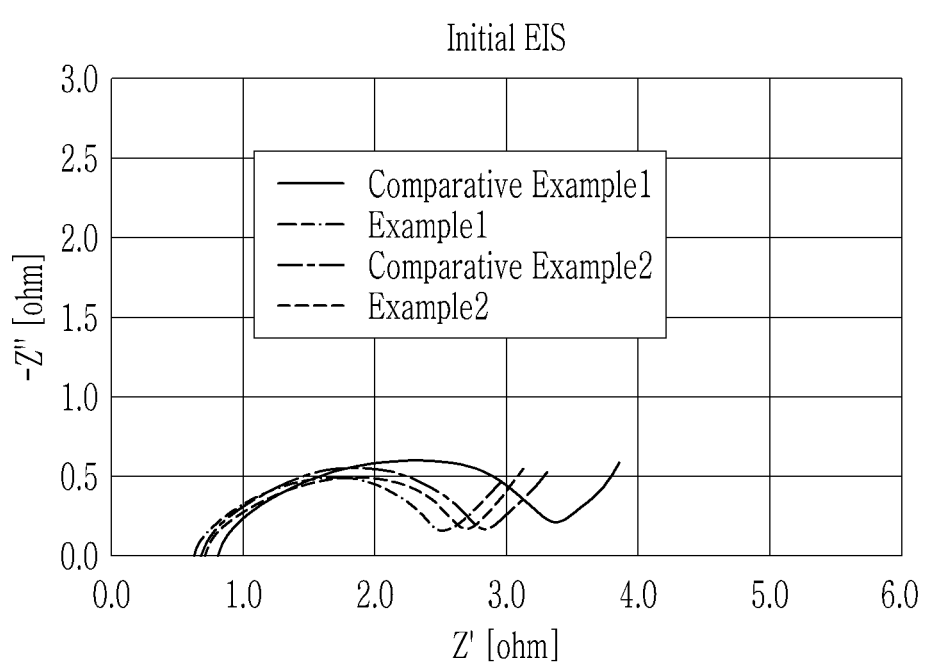
FIG. 2 is a Nyquist plot showing initial impedance analysis results for a lithium secondary battery cells.
Figure 3:
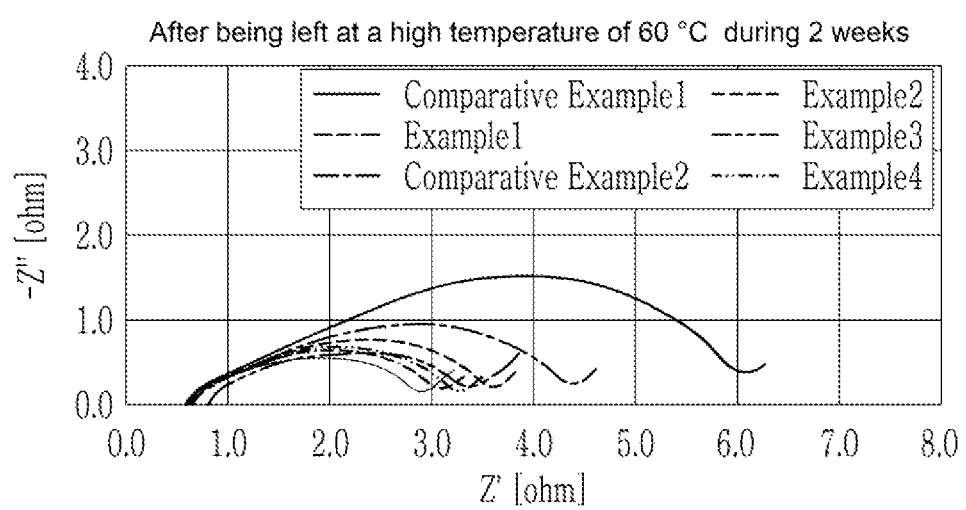
FIG. 3 is a Nyquist plot showing impedance analysis results for lithium secondary battery cells after being left at a high temperature (2 weeks).

The circular full cells according to Examples 1 to 4 and Comparative Examples 1 and 2 were measured with respect to initial impedance spectrum at room temperature (25° C.) and impedance spectrum after being placed at a high temperature of 60° C. in an oven for 2 weeks, and the results are shown in FIGS. 2 and 3 and Tables 2 and 3. The impedance spectra examined through electrochemical impedance spectroscopy (EIS) were used to measure impedance. An impedance meter used herein was VMP3B-10 made by BioLogic Science Instruments.

The initial impedance measurement results of the circular full cells are shown in FIG. 2 and Table 2.

FIG. 2 is a Nyquist plot showing initial impedance analysis results for a lithium secondary battery cells.

TABLE 2

| | Rs |
|---|---|
| Comparative Example 1 | 0.81 |
| Example 1 | 0.63 |
| Comparative Example 2 | 0.70 |

In Table 2, $R_S$ indicates solution resistance (bulk resistance).

Referring to FIG. 2 and Table 2, initial resistance of Example 1 including the novel additive of the present invention along with VC decreased, compared with those of Comparative Example 1 including VC alone and Comparative Example 2 including a different additive from the novel additive along with VC.

In addition, the impedance measurement results of the circular full cells after being placed at 60° C. are shown in FIG. 3 and Table 3.

FIG. 3 is a Nyquist plot showing impedance analysis results of lithium secondary battery cells according to Examples 1 to 4 and Comparative Examples 1 and 2 after being left at a high temperature (2 weeks).

TABLE 3

|  | Rs | $R_{CT+SEI}$ | $R_{total}$ | Resistance increase rate (%) |
|---|---|---|---|---|
| Comparative Example 1 | 0.63 | 5.49 | 6.12 | 250.9 |
| Example 1 | 0.63 | 2.42 | 3.05 | 118.7 |
| Comparative Example 2 | 0.63 | 3.79 | 4.42 | 151.8 |
| Example 2 | 0.63 | 2.89 | 3.52 | 126.1 |
| Example 3 | 0.79 | 2.51 | 3.30 | 112.0 |
| Example 4 | 0.61 | 2.59 | 3.20 | 111.1 |

In Table 3, $R_S$ indicates solution resistance (bulk resistance), $R_{CT+SEI}$ indicates interface resistance, and $R_{total}$ indicates entire resistance.

Referring to FIG. 3 and Table 3, when the additive of the present invention (novel additive and VC) was included, initial resistance or interface resistance when being placed at a high temperature decreased, and thus the entire resistance decreased, and resultantly, a resistance increase rate thereof greatly decreased. Accordingly, output characteristics of the lithium secondary battery cells were expected to be improved.

Evaluation 2: Evaluation of Cycle-life Characteristic

Figure 4:
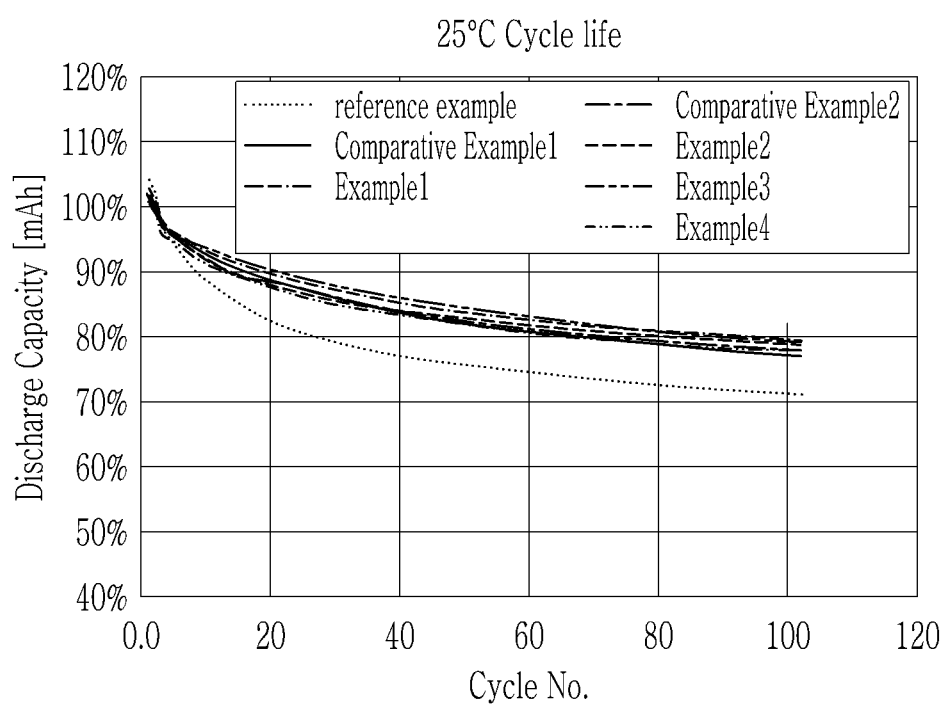
FIG. 4 is a graph showing a discharge capacity retention at 25° C. according to a cycle of a lithium secondary battery.

The lithium secondary battery cells according to Examples 1 to 4, Reference Example, and Comparative Examples 1 and 2 were charged for 10 minutes under a condition of CC-CV 4 A, 4.2 V, and 100 mA cut-off and discharged under a condition of CC 10 A, and 2.8 V cut-off for 30 minutes as one cycle at room temperature (25° C.), and capacity retentions thereof after 100 cycles were evaluated and are shown in FIG. 4.

FIG. 4 is a graph showing discharge capacity retention at 25° C. according to a cycle of the lithium secondary battery cells.

Referring to FIG. 4, capacity retentions of Examples 1 to 4 according to the present invention were not deteriorated but maintained to some extent.

Accordingly, a lithium secondary battery cell including a compound represented by Chemical Formula 1 and simultaneously, a negative electrode film former as an additive exhibited excellent cycle-life characteristics as well as secured high temperature stability as described above.

Evaluation 3: Gas Generation Measurement after Stored at High Temperature

After storing the circular cells according to Examples 1 to 4, Reference Example, and Comparative Examples 1 and 2 at 60° C. for 2 weeks and punching a hole at the bottom of the cells by using a gas-collecting jig, the amount of internally generated gas was measured through gas chromatography (GC) connected thereto without external leakage of the generated gas.

Figure 5:
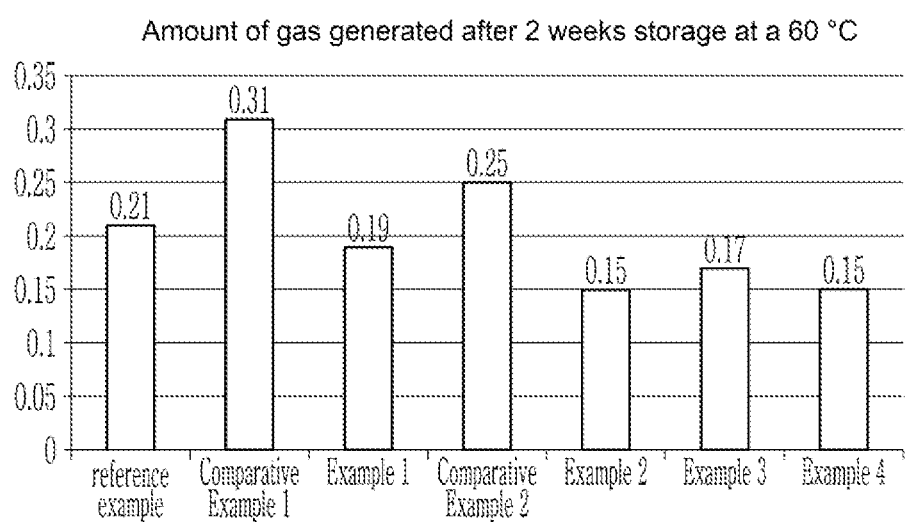
FIG. 5 shows the result of measuring the amount of gas generated after 2 weeks of high temperature storage for the lithium secondary battery.

These gas amount measurement results are shown in FIG. 5.

FIG. 5 shows the results of measuring the amount of gas generated after 2 weeks of high temperature storage for the lithium secondary battery cells according to Examples 1 to 4, Reference Example, Comparative Examples 1 and 2.

As shown in FIG. 5, the generated gas amounts of the lithium secondary battery cells including the additive composition of the present invention according to Examples 1 to 4 were greatly reduced, compared with those of comparative examples and reference example not including some of the additive composition of the present invention.

Accordingly, an electrolyte according to an embodiment had a particular composition and thus improved stability of the lithium secondary battery cells.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. An electrolyte for a lithium secondary battery, comprising
a non-aqueous organic solvent, a lithium salt, and an additive,
wherein the additive comprises a compound represented by Chemical Formula 1 and a negative electrode film forming agent:

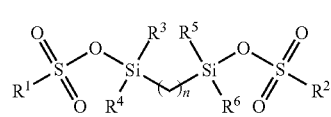

[Chemical Formula 1]

wherein, in Chemical Formula 1,
$R^1$ to $R^6$ are independently hydrogen, a substituted or unsubstituted C1 to C10 alkyl group, a substituted or unsubstituted C1 to C10 alkoxy group, a substituted or unsubstituted C2 to C10 alkenyl group, a substituted or unsubstituted C2 to C10 alkynyl group, a substituted or unsubstituted C3 to C10 cycloalkyl group, or a substituted or unsubstituted C3 to C10 cycloalkenyl group, and
n is an integer of 1 to 10.

2. The electrolyte for a lithium secondary battery of claim 1, wherein the compound represented by Chemical Formula 1 is represented by Chemical Formula 1A:

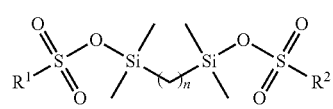

[Chemical Formula 1A]

wherein, in Chemical Formula 1A,
$R^1$ and $R^2$ are independently hydrogen, a substituted or unsubstituted C1 to C10 alkyl group, a substituted or unsubstituted C1 to C10 alkoxy group, a substituted or unsubstituted C2 to C10 alkenyl group, a substituted or unsubstituted C2 to C10 alkynyl group, a substituted or unsubstituted C3 to C10 cycloalkyl group, or a substituted or unsubstituted C3 to C10 cycloalkenyl group, and
n is an integer of 1 to 10.

3. The electrolyte for a lithium secondary battery of claim 2, wherein $R^1$ and $R^2$ are independently a substituted or unsubstituted C1 to C4 alkyl group, or a substituted or unsubstituted C2 to C4 alkenyl group.

4. The electrolyte for a lithium secondary battery of claim 2, wherein $R^1$ and $R^2$ are independently a C1 to C4 alkyl group that is unsubstituted or substituted with a halogen or a cyano group, or a C2 to C4 alkenyl group that is unsubstituted or substituted with a halogen or a cyano group.

5. The electrolyte for a lithium secondary battery of claim 1, wherein
$R^1$ and $R^2$ are independently an unsubstituted methyl group, an unsubstituted ethyl group, or an unsubstituted vinyl group, and
$R^3$ to $R^6$ are independently a substituted or unsubstituted C1 to C5 alkyl group.

6. The electrolyte for a lithium secondary battery of claim 1, wherein the negative electrode film forming agent comprises at least one of vinylene carbonate (VC), vinylethylene carbonate (VEC), and fluoroethylene carbonate (FEC).

7. The electrolyte for a lithium secondary battery of claim 1, wherein
the compound represented by Chemical Formula 1 is included in an amount of 0.05 wt % to 5 wt % based on a total weight of the electrolyte for a lithium secondary battery, and
the negative electrode film forming agent is included in an amount of 0.05 wt % to 20 wt % based on the total weight of the electrolyte for the lithium secondary battery.

8. The electrolyte for a lithium secondary battery of claim 1, wherein
the compound represented by Chemical Formula 1 is included in an amount of 0.1 wt % to 2 wt % based on a total weight of the electrolyte for a lithium secondary battery, and
the negative electrode film forming agent is included in an amount of 0.5 wt % to 5 wt % based on the total weight of the electrolyte for the lithium secondary battery.

9. The electrolyte for a lithium secondary battery of claim 1, wherein the additive further comprises a nitrile-based compound.

10. The electrolyte for a lithium secondary battery of claim 9, wherein the nitrile-based compound comprises at least one of succinonitrile, adiponitrile, and glutaronitrile.

11. The electrolyte for a lithium secondary battery of claim 9, wherein the nitrile-based compound is included in an amount of 0.2 wt % to 5 wt % based on a total weight of the electrolyte for the lithium secondary battery.

12. A lithium secondary battery comprising
a positive electrode;
a negative electrode; and
the electrolyte of claim 1.

13. The lithium secondary battery of claim 12, further comprising a SEI (solid electrolyte interphase) layer on the surface of the negative electrode,
wherein the SEI layer comprises a reaction product of the additive.

* * * * *